Patented Jan. 5, 1932

1,840,075

UNITED STATES PATENT OFFICE

SHIRLEY L. AMES, OF NEWTONVILLE, MASSACHUSETTS, ASSIGNOR TO CHEM-ELECTRIC ENGINEERING CORPORATION, A CORPORATION OF NEW YORK

PRODUCTION OF DRY SUGAR

No Drawing.   Application filed January 3, 1924.   Serial No. 684,200.

The usual sources of sugar, such as sugar cane juice and sugar beet juice, contain other sugars besides sucrose which constitutes substantially what is the ordinary table sugar of commerce. For example, these sources of sugar contain, in addition, invert sugar or levulose. According to the commonly practiced processes of sugar manufactures, only such sugar as is crystallizable results as the commercial product and this is solely sucrose. In addition, according to this common practice, all of the sucrose is not made available and there remain, as bi-products, soft syrup, refiner's syrup and molasses, all of which are sugar containing, but of low commercial value. By subjecting a liquid source of sugar, such as sugar cane juice, soft syrup, refiner's syrup or sugar beet juice to the process of spray-drying in air, the liquid contained may be removed in the dehydrating air and all the solids of the sugar source thrown down. That is, by this method of producing sugar, all the sugars of the original source are obtained and not merely the crystallizable sucrose. This sugar, however, resulting from spray-drying, is more or less hygroscopic. In fact, much of it is very hygroscopic, so much so, as to require special packaging to protect it commercially against the absorption of moisture from the atmosphere. This hygroscopic quality impairs the commercial value of such spray-dried sugar.

The object of my invention is to produce non-hygroscopic spray-dried sugar, or, more broadly, to reduce the hygroscopic quality of spray-dried sugar, made from such sources as those above enumerated. I don't limit my invention to any particular apparatus employed in the practice of spray-drying, but it is applicable to the product of any of the several well-known apparatus commercially employed in spray-drying.

The appearance of ordinary spray dried sugar cane juice and in fact all sugar juice under the microscope is that of a myriad of microscopically small spheres which are translucent, almost transparent, as if they were made out of jelly and sometimes they give the appearance of a spherical shell with a sphere within it. After the practice of the invention described below, the appearance of the product under the microscope is milky opaque, something like a snowball, and some of the spheres are broken but giving ocular evidence of being fractions of spheres and the appearance under the microscope is as if the spheres were solid and not jelly-like. There seems to be a definite sub-structure smaller than the microscopic sphere itself. Light is reflected from the surfaces of the broken spheres as if the sub-structure were crystalline but in the form of crystals too small to be individually observed.

In practicing my invention, the spray-dried product of a source of sugar should be thoroughly triturated in a relatively large quantity of a volatile liquid which is non-injurious to the spray-dried sugar. I prefer to employ as such triturating liquid ether, although carbon disulphide and chloroform are possible of employment. The quantity required for such trituration is such as to make possible complete and thorough trituration, say, four parts of the volatile liquid by volume to one part of the spray-dried sugar. The process may be a continuous one by conducting the trituration in a closed mixing machine, into which the volatile liquid and the sugar are being continuously introduced at such relative and actual rates as to maintain the required proportions during the triturating process and to effect an outflow after the required time interval for trituration. The resulting mixture of the volatile liquid, such as ether and the spray-dried sugar, is then subjected to filtration. The filtrate consists principally of the volatile liquid such as the ether. The pure volatile liquid is then reclaimed preferably by distillation. The residue from the filtration process is then aerated as by subjecting it to an air blast to remove the last traces of the volatile liquid employed for trituration.

The resulting sugar, I find, has become substantially non-hygroscopic.

I prefer the employment of ether in the practice of my invention because practically none of the sugar is soluble in the ether, whereas some of the inverts are partially soluble in alcohol. I do not limit my invention to any one volatile liquid, but consider it broad and generic to any volatile liquid or mixture of volatile liquids capable of trituration with spray-dried sugar and functioning to render the same substantially non-hygroscopic.

The inventive thought may have a variety of expressions as is contemplated in what I claim and desire to secure by United States Letters Patent as follows:

1. As an article of manufacture, a sugary substance in the form of small particles having the shape of microscopic spheres and fragments of spheres, which are milky-white and opaque under the microscope and which comprise a microscopic substructure of things different from and smaller than said microscopic spheres and fragments of spheres.

2. As an article of manufacture, a sugary substance in the form of particles having the shape of microscopic spheres and fragments of spheres and having a substructure of microscopically small crystals and which substance is substantially non-hygroscopic.

3. As an article of manufacture, a sugary substance in the form of small particles having the shape of microscopic spheres and fragments of spheres which are milky-white and opaque under the microscope which comprise a substructure of microscopically small crystals and which substance is substantially non-hygroscopic.

4. As a product of manufacture, a substantially anhydrous and substantially non-hygroscopic comminuted substance in the form of substantially microscopic spheres and fractions of spheres, derived entirely from spray dried sugar cane juices.

In witness whereof, I have signed my name to this specification, this 5th day of October, 1923.

SHIRLEY L. AMES.